W. J. ROSS.
SAW SET.
APPLICATION FILED JULY 16, 1919.
1,361,777.
Patented Dec. 7, 1920.
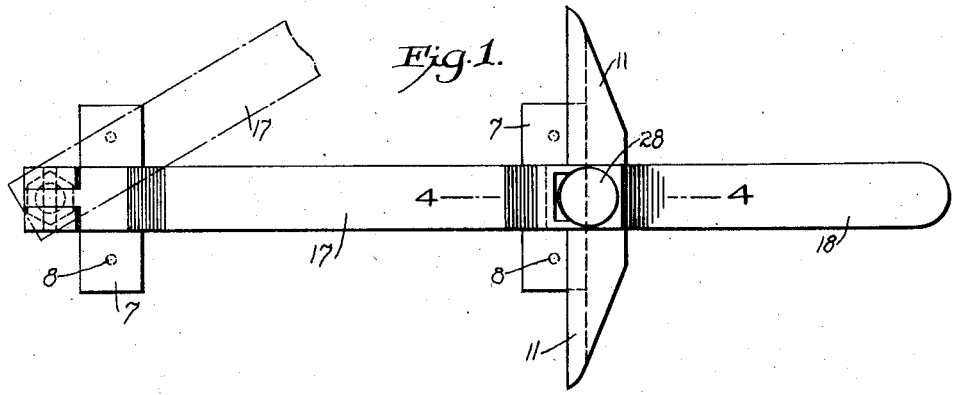
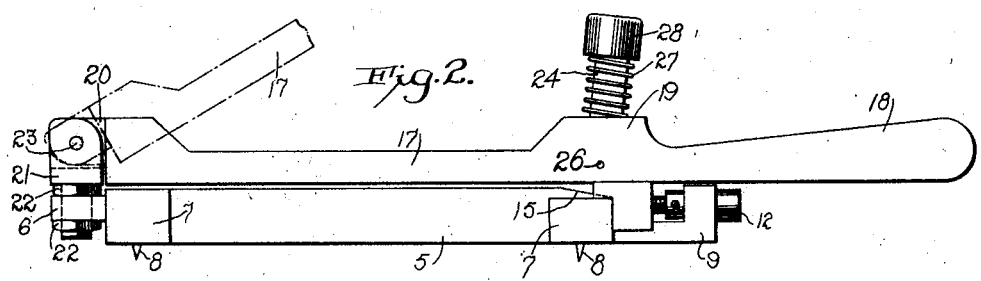
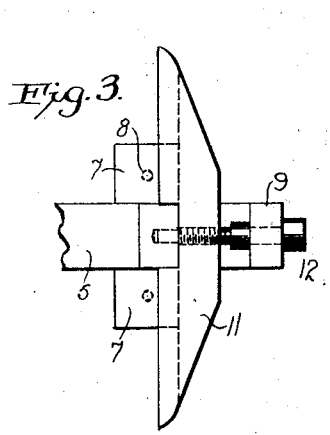
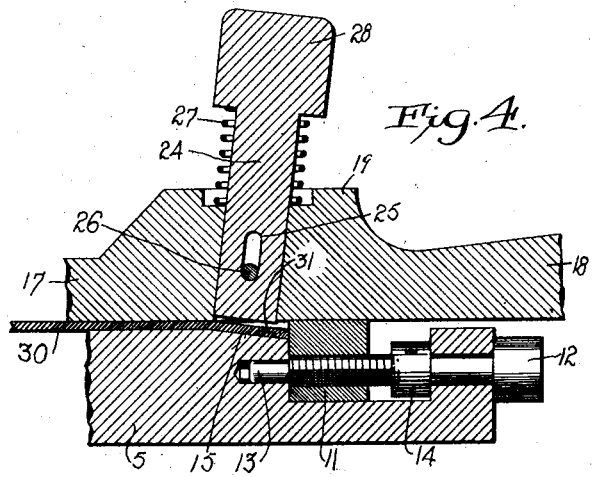
WITNESSES
INVENTOR
WILBERT J. ROSS
BY
ATTORNEYS

UNITED STATES PATENT OFFICE.

WILBERT J. ROSS, OF RIDDLE, OREGON.

SAW-SET.

1,361,777. Specification of Letters Patent. Patented Dec. 7, 1920.

Application filed July 16, 1919. Serial No. 311,145.

*To all whom it may concern:*

Be it known that I, WILBERT J. ROSS, a citizen of the United States, and a resident of Riddle, county of Douglas, and State of Oregon, have invented a new and Improved Saw-Set, of which the following is a full, clear, and exact description.

This invention relates to saw set devices for use in setting the cutting angle of saw teeth.

A broad purpose is to provide a saw set convenient to carry and handle by lumbermen, and a saw set which can be quickly adjusted to saws in order to expedite the setting of the saw teeth for obtaining adequate saw blade clearance for said blade when cutting through timber.

A further purpose is to provide a saw set which will be strong and durable and which will have eliminated therefrom all characteristics of delicate nature so prevalent in many saw sets. It is a purpose to provide a saw set to be driven by a hammer blow to set the saw tooth in proper angular position with the saw blade.

With the above and other objects in view, the invention has relation to a combination and arrangement of parts, an example of which is herein set forth, pointed out in the appended claims and portrayed in the accompanying drawings, wherein:

Figure 1 shows a plan view of the saw set, and Fig. 2 shows a side elevation thereof.

Fig. 3 shows a plan fragmentary view of a tooth depth gage element adjustably retained upon the body or base, and Fig. 4 shows a sectional detail taken upon the line 4—4 of Fig. 1.

In constructing a saw set according to the plans of this invention, I employ two substantial and relatively heavy metal bodies pivoted together in order to receive the saw blade and teeth thereinbetween. One of the pivoted bodies is provided with a set plunger which is driven with force by hammer against the saw tooth to dispose said tooth at an angle relatively with the saw blade. A tooth depth gage is adjustably mounted on one of the bodies to adapt the saw set device to reset saw teeth of various lengths. The pivoted bodies are provided with adjustable means to adapt the saw set to saw blades of various thicknesses.

Referring more in particular to the drawings for a comprehensive view of the details of this invention, the reference numeral 5 points out a body or base of an appropriate length and provided with an ear 6 at one end through which a hole is drilled. In order to securely mount the body or base on a log, block or other body to obtain a steady disposition of the saw set during operation, there are arms 7 extending outwardly from the body. These arms are provided with pins 8 which may be driven or inserted into a block to hold the body in position when saws are to be set. An up-turned lug 9 is integrally formed on the other end of the base and a hole drilled horizontally through the lug.

A tooth depth gage 11 is slidably mounted on the end of the body adjacent the lug 9. This member, as shown in the drawings, is provided with a straight edge plane face along which the toothed edge of the saw is guided while the teeth are being re-set. A gage adjusting screw 12 is rotatably confined in the bore formed through the lug 9. The inner end of the gage adjusting screw is shaped down to a journal 13, and rotatably confined in a hole formed in the base. A collar 14 is fixed to the body of the screw in order to confine said screw against longitudinal movement with the base. The gage adjusting screw is threaded and screwed into connection with the tooth depth gage. The tooth gage is slidably retained on the base and movable back and forth by turning the gnurled head of the adjusting screw. The base 5 is shaped down to a re-setting angle 15 adjacent the tooth gage. The line 15 points out the downwardly inclined plane of the base against which each tooth of the saw will be driven in order to re-set said tooth. This angular tooth seat 15 is cut to any approved angle which is most suitable for re-setting saw teeth.

A pressure lever 17 is provided with a handle 18, and with an enlarged body or boss 19. The rear end of the pressure lever is reduced in size to form an ear 20. The ear 20 is pivotally confined between a bifurcated bolt 21. This bolt 21 has a lower threaded shank passed through the ear 6 and secured thereto by nuts 22. It is preferable to dispose one nut upon each side of the ear 6 in order to obtain an adjustment, as later seen. The pressure lever is pivotally mounted on a pin 23 with the pin fixed in the bifurcated bolt. This permits the pressure lever to be raised and lowered over the base, as shown by dotted lines in Fig. 2, and pivoted concentrically about the bolt, as shown by dotted lines in Fig. 1.

The boss 19 of the pressure lever is provided with a hole, preferably rectangular in shape, formed therethrough. A tooth set plunger 24 is slidably confined in this bore. The plunger is provided with a slot 25 through which a retaining pin 26 is passed, said retaining pin being fixed in the walls of the pressure lever. The pin functions to retain the tooth set plunger in position. A coil compression spring 27 is confined upon the set plunger between the head 28 of said plunger and the upper face of the boss 19. The set plunger is disposed in the pressure lever right angular with the plane of the tooth seat 15. This arrangement disposes the lower end of the tooth set plunger parallel with the plane of the tooth seat 15. The tooth depth gage 11 will preferably extend slightly above the upper face of the base 5 in order to space the pressure lever slightly above the upper face of the base 5. This leaves sufficient space between the parts 5 and 17 to permit a saw blade to pass through the device.

A cross-cut saw, or in fact any type of saw, is disposed between the pressure lever and the base with a tooth of said saw disposed under the setting plunger 24. The saw is placed contiguously with the straight edge face of the depth gage so as to bring the tooth of the saw into proper relation with the setting plunger. The plunger head 28 is then given a blow with a hammer sufficiently hard to reset the saw tooth, causing it to lie against the angular tooth seat 15. This bends the saw tooth on the saw body and leaves a permanent set of correct angle in the tooth. The saw blade is moved through the device and the operation repeated on every other tooth until the saw is completely re-set.

The bifurcated bolt 21 provides a saw thickness gage and renders the device adaptable to receive saw blades of various thicknesses. In using this saw-set it is desirable to adjust the bolt 21 by proper disposition of the nuts 22 so that the space between the members 5 and 17 will be just sufficient to receive the saw blade. When the pressure lever is brought into downwardly contiguous position against the saw blade, said blade should be clamped between the base and lever in order to hold the saw tooth in proper alinement under the setting plunger. Fig. 4 shows a saw blade 30 with a saw-tooth 31 disposed under the setting plunger, said tooth having been set by a blow upon the plunger.

Having thus described my invention, what I claim as new, and desire to secure by Letters Patent is:

1. A saw set comprising a base member provided with an inclined tooth seat, a tooth depth gage adjustably related to the inclined face of the tooth seat, an inclined setting plunger provided to act against a saw and to force a tooth of said saw against the tooth seat, and an adjustable pressure lever device employed to clamp the saw blade in position during the re-setting operation.

2. A saw re-setting machine comprising: a base member provided with an annular tooth seat and adjacent oppositely projecting arms provided with holding means, the opposite end of said base member being provided with similar arms also formed with holding means, a tooth depth gage slidably mounted on the base, said base having a notch cut transversely adjacent to the tooth seat and said gage comprising a screw mounted to turn in the wall beneath the seat and through the outer portion of the base beyond said notch, means to hold said screw against longitudinal movement, and said screw having threaded engagement with the gage, whereby said gage may be brought in close or spaced relation with the angular tooth seat, a pressure lever hinged upon the base, a setting plunger slidably confined in associated relation with the pressure lever whereby the plunger may be driven against a tooth disposed over the angular tooth seat.

3. A saw resetting machine comprising a base member provided with an angular tooth seat, and a notch cut in the end of the base member adjacent the tooth seat, a sliding block confined in the notch functioning as a tooth-depth gage, a pressure lever pivoted upon the base member, and adjustable vertically at the connection, a plunger having a slot slidably confined in the pressure lever at an inclined angular position, a pin inserted through the slot of the plunger and fixed in the pressure lever to confine the plunger in position, and a spring to normally restrain the plunger from engagement with the tooth of a saw inserted between the pressure lever and the base member.

4. A saw resetting machine comprising a pair of relatively pivoted members adapted to lie in normally parallel relation, a bolt passing through one of the pivoted members, and the end of the other member pivoted on the bolt, adjusting nuts threaded on the bolt such that the pivoted members can be adjusted in spaced relation one from the other so as to accommodate the saw blades of various thicknesses, a tooth-depth gage mounted on one of the pivoted members, and a setting plunger mounted in the other pivoted member.

WILBERT J. ROSS.